United States Patent [19]

Takahashi

[11] 3,784,869

[45] Jan. 8, 1974

[54] VERTICAL CONVERGENCE CIRCUIT

[75] Inventor: Michiaki Takahashi, Iwai, Japan

[73] Assignee: Victor Company of Japan, Ltd., Karagawa-ken, Japan

[22] Filed: Mar. 24, 1972

[21] Appl. No.: 237,679

[30] Foreign Application Priority Data

| | | |
|---|---|---|
| May 29, 1971 | Japan | 45-18596 |
| June 3, 1971 | Japan | 45-39124 |
| July 8, 1971 | Japan | 45-50464 |
| July 8, 1971 | Japan | 45-50465 |
| July 19, 1971 | Japan | 45-53736 |

[52] U.S. Cl. ...... 315/13 C, 315/13 CG, 315/27 TD, 315/27 GD

[51] Int. Cl. ........ H01j 29/50

[58] Field of Search ........ 315/13 C, 13 CG, 315/27 TD, 27 XY, 27 GD; 335/213

[56] References Cited

UNITED STATES PATENTS

| | | | |
|---|---|---|---|
| 2,910,618 | 10/1959 | Vasilevskis | 315/13 CG |
| 3,114,858 | 12/1963 | Schopp | 315/13 CX |
| 3,163,797 | 12/1964 | Singleback | 315/13 C |
| 3,447,025 | 5/1969 | Kool | 315/13 C |
| 3,531,682 | 9/1970 | Jarosz | 315/13 C |
| 3,613,109 | 10/1971 | Jarosz | 315/13 C |

*Primary Examiner*—Carl D. Quarforth
*Assistant Examiner*—P. A. Nelson

[57] ABSTRACT

A vertical convergence circuit comprises a single saw-tooth waveform voltage source in a vertical deflection circuit, a variable resistor for regulation of the amplitude of a parabolic current which applies a saw-tooth waveform voltage to one terminal of a convergence coil circuit, and a variable resistor for tilt regulation of a parabolic current which applies a pulsive voltage obtained by differentiating a saw-tooth waveform voltage to the other terminal of the convergence coil circuit.

13 Claims, 22 Drawing Figures

VERTICAL CONVERGENCE CIRCUIT

BACKGROUND OF THE INVENTION

This invention relates to a convergence circuit and more particularly to a dynamic vertical convergence circuit in a shadow-mask type tri-color television picture tube.

In a shadow-mask type tri-color television picture tube, in general, it should be necessary that three electron beams emitted from three electron guns concentrate uniformly over the entire fluorescent screen or phosphor face plate of the tube. For this purpose, means for dynamic convergence and static convergence have been used.

A dynamic convergence circuit known heretofore each has a circuit organization wherein a tertiary winding and a quaternary winding are provided specially in the vertical output transformer as a pulse voltage source, and pulse voltages of the vertical scanning period generated therein are used. In this conventional circuit, the vertical output transformer used becomes bulky as a natural result. Furthermore, the provision of tertiary and quaternary windings respectively with intermediate taps in the vertical output transformer gives a great increase in the number of production process steps and attendant rise in cost. In addition, in an ordinary color television receiver, the convergence circuit and the vertical output transformer are disposed in positions spaced apart to some extent. For this reason, the wiring work in the assembling of the receiver becomes complicated, and the number of process steps increases.

SUMMARY OF THE INVENTION

Accordingly, it is a general object of the present invention to provide a new and advanced vertical convergence circuit wherein the above described disadvantages of the prior art have been removed.

Another object of the invention is to provide a vertical convergence circuit of a simple circuit construction. In the circuit of this invention, only a single source of a voltage of saw-tooth waveform is used for the voltage source. From this single saw-tooth voltage source, a sawtooth voltage and a pulsive voltage are produced. Accordingly, there is no necessity for using components such as a large vertical output transformer provided with a special winding or an active element for pulse generation. Another advantageous feature is that the television receiver can be miniaturized and reduced in weight. Furthermore, the wiring work in the assembly process is simplified.

Still another object of the invention is to provide a vertical convergence circuit capable of accomplishing slope regulation over a wide range of a parabolic current flowing in convergence coils. The circuit of the present invention can be advantageously applied to a shadow-mask type color tube of a form wherein, of the three electron guns, the blue electron gun is disposed on the lower side, whereby excellent dynamic convergence can be attained.

Other objects and further features of the invention will be apparent from the following detailed description with respect to preferred embodiments of the invention when read in conjunction with the accompanying drawings, in which like like parts are designated by like reference numerals and characters.

DETAILED DESCRIPTION

Figure 1:
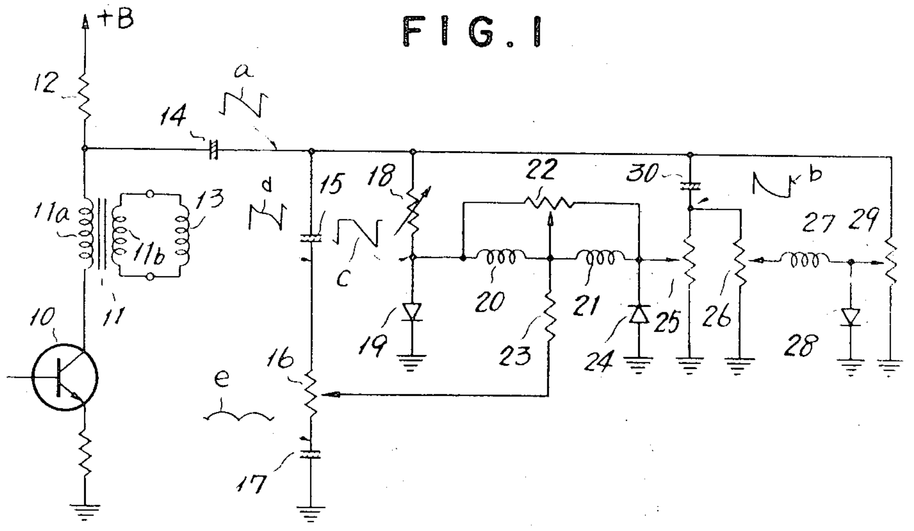
FIG. 1 is a circuit diagram of a first embodiment of a vertical convergence circuit according to the invention.

In the first embodiment of the vertical convergence circuit according to the present invention as illustrated in FIGS. 1 through 4, there is provided a vertical output transistor 10 having a grounded emitter and a collector connected to one terminal of the primary winding 11*a* of a vertical output transformer 11. The other terminal of the primary winding 11*a* of the transformer 11 is connected by way of a resistor 12 to a power source +B. A vertical deflection coil 13 is connected to the secondary winding 11*b* of the transformer 11. A sawtooth voltage obtained from the junction between the primary winding 11*a* and the resistor 12 is supplied through a coupling capacitor 14 to a vertical convergence circuit described below.

Between the capacitor 14 and the ground (earth), a capacitor 15, a variable resistor 16 and a capacitor 17 are connected in series. Furthermore, between the capacitor 14 and the ground, a variable resistor 18 and a diode 19 are connected in series. To the junction between the variable resistor 18 and the diode 19, a green color convergence coil 20 and a red color convergence coil 21, mutually in series connection, and a variable resistor 22, in parallel connection therewith, are connected. The junction between the coils 20 and 21 is connected by way of a resistor 23 to the sliding contact of the variable resistor 16 and also to the sliding contact of the variable resistor 22. One terminal of each of the coil 21 and the variable resistor 22 is grounded through a diode 24 of reverse polarity and is connected to the sliding contact of a variable resistor 25 connected in series with a capacitor 30 between the capacitor 14 and the ground.

The variable resistor 16 is provided for the purpose of causing differential variation of the tilt of a parabolic current passed through the red color and green color convergence coils 21 and 20 and is hereinafter referred to as a R-G differential tilt variable resistor. The variable resistor 18 is provided for regulation of the amplitude of the parabolic current passed through the coils 21 and 20 and is hereinafter referred to as a R-G amplitude variable resistor. The variable resistor 22 is provided for causing differential variation of the amplitude of the parabolic current passed through the coils 21 and 20 and is hereinafter referred to as a R-G differential amplitude variable resistor. The variable resistor 25 is for tilt regulation of the parabolic current passed through the coils 21 and 20 and is hereinafter referred to as a R-G tilt variable resistor.

A variable resistor 26 is connected in parallel with the variable resistor 25, and its sliding contact is connected to one terminal of a blue color convergence coil 27. The other terminal of the coil 27 is grounded through a diode 28 and is connected to the sliding contact of a variable resistor 29 connected between the capacitor 14 and the ground.

The variable resistor 26 is provided for the purpose of tilt regulation of a parabolic current passed through the blue color convergence coil 27 and is hereinafter referred to as a B tilt variable resistor. The variable resistor 29 is for amplitude regulation of the parabolic current passed through the blue convergence coil 27 and is hereinafter referred to as a B amplitude variable resistor.

A saw-tooth voltage (as indicated by waveform *a* in FIG. 1) supplied through the capacitor 14 from the vertical deflection circuit is supplied to the blue convergence coil 27 through the B amplitude variable resistor 29 with suitable amplitude adjusted by the sliding contact of the variable resistor 29. A suitable parabolic current thereby flows through the coil 27. On one hand, the saw-tooth voltage supplied through the capacitor 14 is differentiated by the capacitor 30 and the B tilt variable resistor 26 and is thereby rendered into a pulsive voltage as indicated by waveform *b*. This pulsive voltage is rendered by the adjustment of the sliding contact of the B tilt variable resistor 26 into a pulse of suitable amplitude (wave height value), which is applied to the blue convergence coil 27. A saw-tooth current thereby flows through the coil 27. Accordingly, a convergence correction current passed through the blue convergence coil 27 is rendered into a current of a waveform necessary for convergence correction by the amplitude regulation of a parabolic current due to adjustment of the B amplitude variable resistor 29 and the amplitude regulation of a saw-tooth voltage by the adjustment of the B tilt variable resistor 26.

The diode 28 is a diode of low rising voltage which is so connected as to prevent shifting of the direct-current level in static convergence and dynamic convergence. The polarity of the saw-tooth current flowing through the convergence coil 27 does not vary even when the B tilt variable resistor 26 (similarly also with respect to the R-G tilt variable resistor 25 described hereinafter) is adjusted. For this reason, the parabolic current caused to flow through the coil 27 by the application of the saw-tooth voltage is preset beforehand with a waveform such as to have tilt of an orientation which is opposite that of the tilt varied by the adjustment of the B tilt variable resistor 26. This presetting is made possible by suitably determining the integration time constant of the convergence coil used and the waveform of the saw-tooth voltage impressed on the convergence coil.

Figure 2:
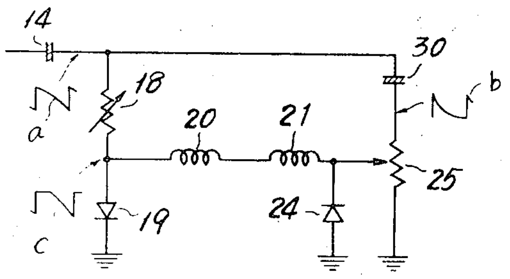
FIGS. 2, 3 and 4 are partial circuit diagrams respectively showing parts excerpted from the circuit illustrated in FIG. 1 for the purpose of describing various regulation operations thereof.

FIG. 2 schematically indicates a circuit portion excerpted from the circuit illustrated in FIG. 1 and relating to R-G amplitude regulation and to R-G tilt regulation with respect to the red convergence coil 21 and the green convergence coil 20. This R-G amplitude regulation and R-G tilt regulation will now be described with reference to FIG. 2.

The saw-tooth voltage of waveform *a* supplied through the coupling capacitor 14 is rendered by the diode 19 connected to the R-G amplitude variable resistor 18 into a voltage in the vicinity of an alternating-current axis clamped at the earth potential and having a part projecting in the negative direction as indicated by waveform *c*. This voltage of the waveform *c* is applied to the green convergence coil 20 and the red convergence coil 21, and a parabolic current flows through both coils 20 and 21. The diode 24 forms a flow path for a parabolic current for preventing variation of the magnitude of the above mentioned parabolic current even when the sliding contact of the R-G tilt variable resistor 25 is adjusted. In addition, the diode 24 operates also to prevent shifting of the direct current level in static convergence and dynamic convergence similarly as in the case of the diode 28.

On one hand, the saw-tooth voltage of the waveform *a* supplied through the coupling capacitor 14 is differentiated by a differentiation circuit comprising the capacitor 30 and the R-G tilt variable resistor 25 and rendered into a pulsive voltage of the waveform indicated by *b*. This pulsive voltage is supplied through the sliding contact of the variable resistor 25 to the series-connected circuit of the red convergence coil 21 and the green convergence coil 20, whereby a saw-tooth current for tilt regulation of a parabolic current flows through these coils 21 and 20.

By suitably adjusting the positions of the sliding contacts respectively of the R-G amplitude variable resistor 18 and the R-G tilt variable resistor 25, the waveform of the R-G convergence correction current can be varied at will. Accordingly, in the case where convergence adjustment is carried out by imparting signals of vertical and horizontal stripe form as signals for adjustment to the television receiver, for example, it is possible by the above mentioned adjustment to accomplish full adjustment so that vertical stripes of yellow color will appear on the reproduction screen.

Figure 3:
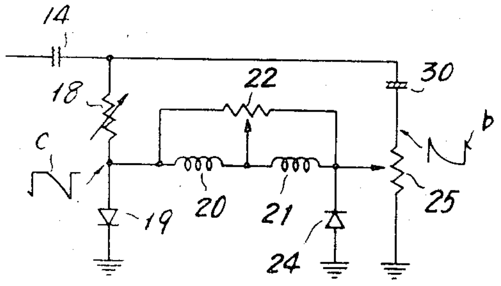

FIG. 3 schematically indicates a circuit portion excerpted from the circuit shown in FIG. 1 and relating to R-G differential amplitude adjustment with respect to the red convergence coil 21 and the green convergence coil 20. The sliding contact of the R-G differential amplitude variable resistor 22 connected in parallel with the red and green convergence coils 21 and 20 is connected to the junction between these two coils 21 and 20. For this reason, it is possible by adjusting the sliding contact of the R-G differential amplitude variable resistor 22 to vary in a mutually and differentially increasing and decreasing manner the magnitudes of the convergence correction currents flowing through the coils 21 and 20, whereby misconvergence in the vertical direction in the lower part of the reproduction screen can be corrected. For example, in the case where convergence adjustment is being accomplished by imparting signals of vertical and horizontal stripe form as adjusting signals to the receiver, convergence adjustment can be carried out by suitably adjusting the R-G differential amplitude variable resistor 22 to cause horizontal lines of yellow color to appear in the lower part of the reproduction screen.

Figure 4:
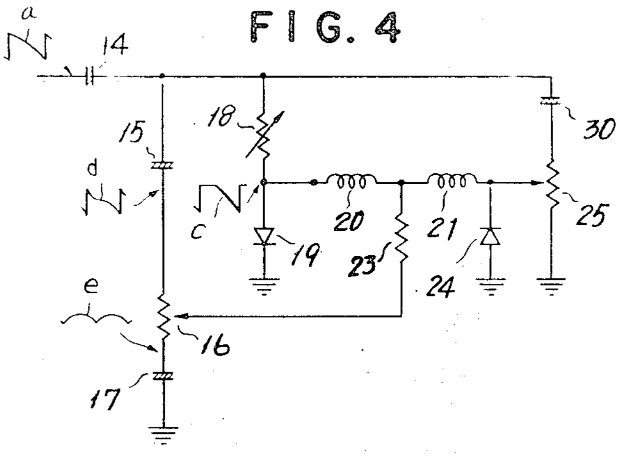

A circuit portion excerpted from the circuit shown in FIG. 1 and relating to R-G differential tilt regulation with respect to the red and green convergence coils 21 and 20 is schematically shown in FIG. 4. In the series-connection circuit of the capacitor 15, the R-G differential tilt variable resistor 16, and the capacitor 17, the capacitance of the capacitor 15 is selected to be of a relatively low value. And a differentiation circuit is formed by the capacitor 15 and the variable resistor 16. For this reason, a voltage of the waveform *d* resulting from differentiation of the saw-tooth voltage of the waveform *a* supplied through the capacitor 14 is produced at the junction between the capacitor 15 and the variable resistor 16. Furthermore, the capacitance of the capacitor 17 is selected to be of a relatively high value, and a parabolic voltage of the waveform *e* is produced at the junction of capacitor 17 and the variable resistor 16.

When a voltage of the waveform *d* is applied to the junction between the red and green convergence coils 21 and 20, by adjustment of the above mentioned R-G differential tilt variable resistor 16, whereby the correction current (parabolic current) flowing in the red convergence coil 21 becomes large, while the correction current flowing in the green convergence coil 20 becomes small in a part corresponding to the upper part of the reproduction picture screen. Furthermore, in the part corresponding to the lower lart of the reproduction picture screen, there is caused a distortion whereby the correction current flowing in the red convergence coil 21 becomes small, while the correction current flowing in the green convergence coil 20 becomes large.

When a voltage of the waveform *e* is applied to the junction between the red and green convergence coils 21 and 20, by adjustment of the R-G differential tilt variable resistor 16, the correction currents flowing in the coils 21 and 20 assume states which are reversed relative to those assumed when the current of the waveform *d* is applied to the above mentioned junction as described above.

Accordingly, by suitably adjusting the sliding contact of the R-G differential tilt variable resistor 16, misconvergence which could not be thoroughly corrected by the circuit illustrated in FIG. 3 can be completely corrected.

In general, there is a color tube of shadow mask type wherein, of the three electron guns for red, green and blue, the electron gun for blue is disposed on the lower side (hereinafter referred to as a BD picture tube). In this BD picture tube, a pincushion distortion occurs at the upper part of the screen with respect to blue color, while a pincushion distortion occurs at the lower part of the screen with respect to red color and green color. However, when this screen is viewed downward from an obliquely upper side, the pincushion distortion relative to red color and green color at the lower part of the screen is actually corrected by the curvature of the screen. Furthermore, since blue color is less conspicuous than red or green color, its distortion can be neglected. For this reason, a circuit for correction of upper and lower pincushion distortions can be omitted in the receiver by using the BD picture tube, whereby the receiver can designed to have an inexpensive organization, and this type of tube is widely used in relatively small size receivers. However, adjustment of the above mentioned R-G tilt variable resistor 25 operates only in the direction to cause an increase in the correction current of the upper part of the screen. For this reason, in the case where the circuit of the first embodiment described above with reference to FIGS. 1 through 4 is applied to the above mentioned BD picture tube, fully satisfactory dynamic convergence cannot be attained because of the following reason.

Figures 5A, 5B, 6:
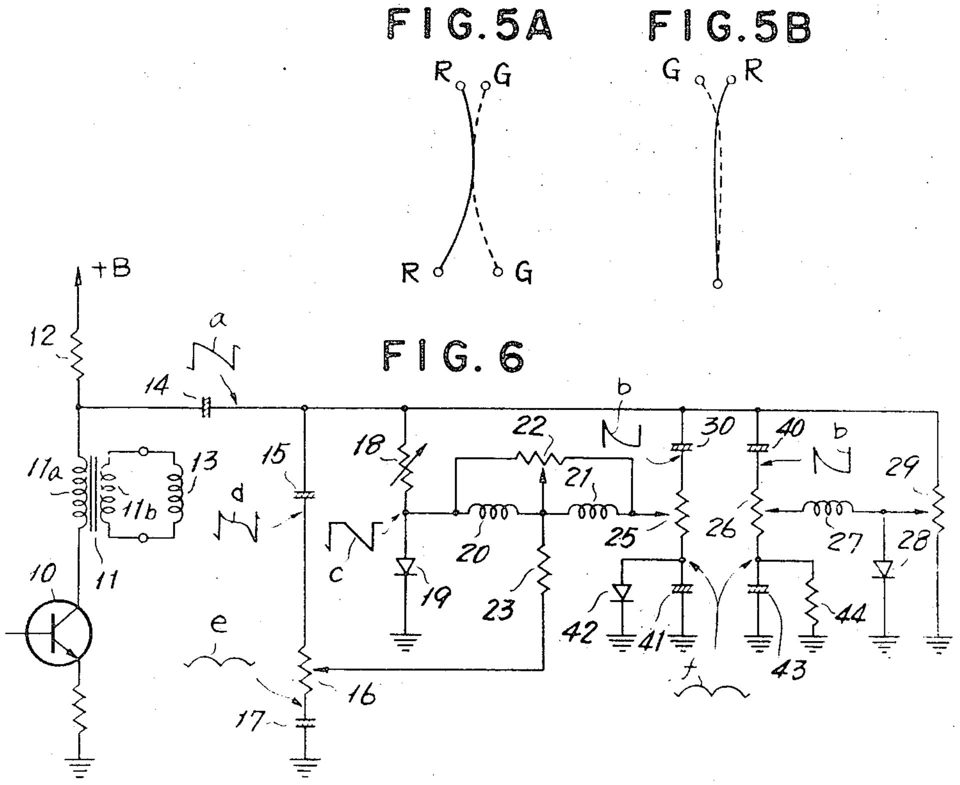
FIGS. 5A and 5B are diagrams for a description of misconvergence on the picture screen of a color tube.
FIG. 6 is a circuit diagram showing a second embodiment of a vertical convergence circuit according to the invention.

In the BD picture tube, in general, the magnitude of misconvergence at the lower part of the screen is greater than that at the upper part of the screen. For example, the states of the red (R) and green (G) vertical lines at the time when cross-hatch signals are reproduced with red, green, and blue at the center of the screen in a statically converged state are indicated in FIG. 5A. Accordingly, in the case where parabolic currents of equal upper and lower magnitudes for dynamic convergence are passed through the convergence coils, and red and green are caused to coincide at the lower part of the screen, the red (R) and green (G) at the lower part of the screen are over-corrected as indicated in FIG. 5B. Therefore, in the case where the BD picture tube is used, it is necessary to adjust the R-G tilt variable resistor in a manner to decrease the correction current for red and green in the upper part of the screen.

However, in the circuit of the first embodiment, the voltage of the waveform *b* obtained by differentiation by the capacitor 30 and the R-G tilt variable resistor 25 as described above operates in only the direction to cause an increase in the correction current with respect to the upper part of the picture screen during adjustment of the variable resistor 25. For this reason, in the BD picture tube, it becomes necessary to preset beforehand variables such as the values of the integration time constants of the convergence coils and the waveforms of the saw-tooth voltages applied on the circuits of the convergence coils in directions such as to cause a decrease in the convergence correction current in the upper part of the receiver picture screen. According to the circuit of the above described first embodiment, it is not possible to attain standardization commonly between the receiver having the blue electron gun of the upper disposition and the receiver having that of the lower disposition.

A second embodiment of the circuit according to the invention in which the above described problems have been solved will now be described with reference to FIG. 6. The parts in FIG. 6 which are the same as or similar to those in the circuit shown in FIG. 1 are designated by like reference numerals and characters, but description thereof will not be repeated. The second embodiment of FIG. 6 differs from the first embodiment in circuit construction as described below.

The R-G tilt variable resistor 25 is connected to the capacitor 30 connected to the capacitor 14, while the B tilt variable resistor 26 is connected to a capacitor 40 connected to the capacitor 14. Between the variable resistor 25 and the ground, a capacitor 41 and a diode 42 are connected in parallel. Between the variable resistor 26 and the ground, a capacitor 43 and a resistor 44 are connected in parallel.

The saw-tooth voltage of the waveform *a* which has passed through the capacitor 14 is applied through the B amplitude variable resistor 29 to one end of the blue convergence coil 27 and also through the R-G amplitude variable resistor 18 to one end of each of the green and red convergence coils 20 and 21, whereby a parabolic current flows through each of the convergence coils 20 and 21 similarly as in the aforedescribed first embodiment.

Furthermore, the saw-tooth voltage of the waveform *a* which has passed through the capacitor 14 is also applied to the series circuit of the capacitor 30 of relatively small capacitance, the R-G tilt variable resistor 25 and the capacitor 41 of relatively large capacitance and also to the series circuit of the capacitor 40 of relatively small capacitance, the B tilt variable resistor 26 and the capacitor 43 of relatively large capacitance. As a result, a voltage of the waveform *b* produced by the differentiation of the saw-tooth wave appears at each of the junctions between the capacitor 30 and the R-G tilt variable resistor 25 and between the capacitor 40 and the B tilt variable resistor 26. Furthermore, a parabolic voltage of the waveform *f* appears at each of junctions between the R-G tilt variable resistor 25 and the capacitor 41 and between the B tilt variable resistor 26 and the capacitor 43.

The operational principle of the R-G tilt regulation and the B tilt regulation in the circuit of the instant embodiment will now be described with reference to FIGS. 7A, 7B and 7C.

Figure 7A:
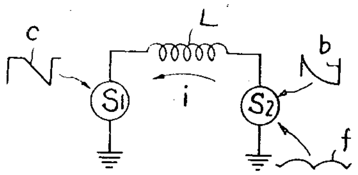
FIGS. 7A, 7B and 7C are schematic diagrams respectively indicating the principle of operation of the circuit illustrated in FIG. 6.
Figure 7B:
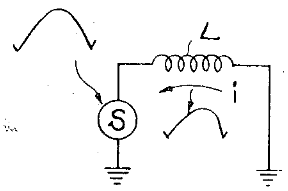
Figure 7C:
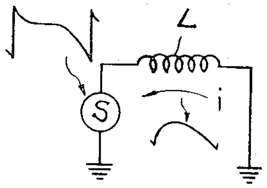
Figure 8:
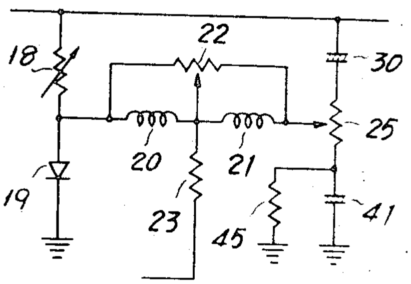
FIG. 8 is a circuit diagram showing a modification wherein the circuit shown in FIG. 6 is partially modified.

In FIGS. 7A, 7B and 7C, the convergence coil L corresponds to the blue convergence coil 27 or the red and green convergence coils 21 and 20 in FIG. 6. In FIG. 7A, reference character $S_1$ designates a voltage source of a saw-tooth voltage of the waveform *c*, applied through the B amplitude variable resistor 29 or the R-G amplitude variable resistor 18 to one terminal of each of the convergence circuits in FIG. 6. Reference character $S_2$ designates a voltage source of a voltage of the waveform *b* or *f* applied to the other terminal of each of the convergence circuits in FIG. 6 in accordance with the adjustment position of the sliding contact of the B tilt variable resistor 26 or the sliding contact of the R-G tilt variable resistor 25. The arrow in FIG. 7A indicates a correction current.

FIG. 7B indicates an equivalent circuit representing the assumed state wherein the sliding contact of the B tilt variable resistor 26 (or the R-G tilt variable resistor 25) in FIG. 6 is positioned nearer the side of the capacitor 40 (or the capacitor 30), and a voltage source S resulting from the combination of the voltage sources $S_1$ and $S_2$ is connected to one end of the convergence coil L in FIG. 7A. The voltage waveform at the voltage source S becomes the sum of the waveform *c* and the waveform resulting from the inversion of the phase of the waveform *b*. The waveform of the parabolic correction current flowing through the convergence coil L at this time becomes such that a large current flows at a position corresponding to the upper part of the picture screen as indicated by the current waveform in FIG. 7B.

FIG. 7C indicates an equivalent circuit representing the assumed state wherein the sliding contact of the B tilt variable resistor 26 (or the R-G tilt variable resistor 25) in FIG. 6 is positioned nearer the side of the capacitor 43, and a voltage source S resulting from the combination of the voltage sources $S_1$ and $S_2$ is connected to one end of the convergence coil L in FIG. 7A. The voltage waveform at the voltage source S becomes the sum of the waveform *c* and the waveform resulting from the inversion of the phase of the waveform *f*. The waveform of the parabolic correction current flowing through the convergence coil L at this time becomes such that a large current flows at a position corresponding to the lower part of the picture screen as indicated by the current waveform in FIG. 7C.

As described above, by applying a saw-tooth wave from a single saw-tooth voltage to a series-connected circuit of a capacitor of a relatively small capacitance, a variable resistor for tilt regulation, and a capacitor of a relatively large capacitance, there is established a state wherein a voltage source of the waveform *b* and a voltage source of the waveform *f* are connected respectively to the two terminals of variable resistors (25 or 26) for respective tilt regulation. Accordingly, by adjusting the sliding contact of this variable resistor (25 or 26), the waveform of the parabolic correction current flowing through the convergence coil L can be varied thereby to accomplish convergence correction.

Referring again to FIG. 6, the diode 42 connected in parallel with the capacitor 41 and the resistor 44 connected in parallel with the capacitor 43 are provided for the purpose of forming a direct-current return circuit on the side of one end of a convergence coil connected at the other terminal thereof to the side of the capacitor 41 or the capacitor 43. Since the diode or resistor is connected in parallel with respect to the capacitor of relatively large capacitance in the above described circuit for tilt regulation, when the current value of the part corresponding to the region in the vicinity of the center of the screen in the parabolic correction current flowing through the convergence coil is caused to be zero, and when the variable resistors (26 and 25) for tilt regulation are adjusted, no dynamic convergence whatsoever is accomplished with respect to that region in the vicinity of the screen center.

In the circuit of the embodiment illustrated in FIG. 6, the diode 42 is used for the circuit of the red and green convergence coils, while the resistor 44 is used for the circuit of the blue convergence coil. However, in the case where the saw-tooth wave of the waveform *a* is amply large, a resistor 45 may be used in place of the diode 42 also for the circuit of the red and green convergence coils. When the diode 42 is used, however, the circuit operation is good even in the case where a relatively small saw-tooth voltage *a* is being supplied to the convergence circuit.

Figure 9:
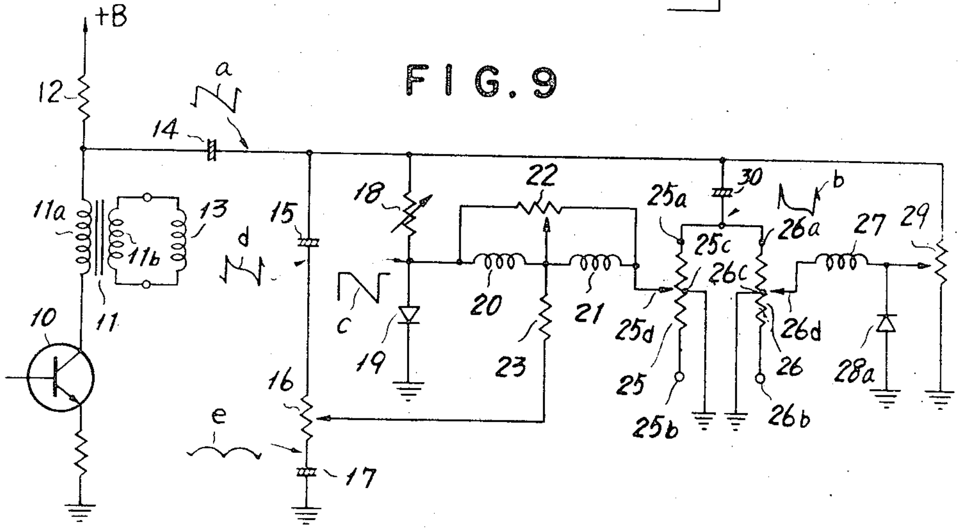
FIG. 9 is a circuit diagram showing a third embodiment of a vertical convergence circuit according to the invention.

Next, a third embodiment of a circuit according to the invention in which the problems of the circuit of the aforedescribed first embodiment are solved will now be described with reference to FIG. 9. The parts in FIG. 9 which are the same as or equivalent to those shown in FIG. 1 are designated by like reference numerals and characters, but description thereof will not be repeated. The features of circuit construction which differ from those of the circuit of the first embodiment are as follows.

The B tilt variable resistor 26 and the R-G tilt variable resistor 25 respectively have intermediate tap terminals **26*c* and 25*c* which are grounded. Terminals 25*a* and 26*a* on one side of the variable resistors 25 and 26 are respectively connected to the capacitor 30** connected to the capacitor 14. Furthermore, the sliding contacts *25d* and *26d* of the variable resistors 25 and 26 are respectively connected to one end of the red convergence coil 21 and to one end of the blue convergence coil 27.

The saw-tooth voltage of the waveform *a* from the capacitor 14 is applied to the series circuit of the capacitor 30 of relatively small capacitance and the B tilt variable resistor 26 and to the series circuit of the capacitor 30 and the R-G tilt variable resistor 25. This saw-tooth voltage is differentiated by a differentiation circuit formed by the capacitance of the capacitor 30 and the resistance between the terminals *26a* and *26c* of the variable resistor 26 and by the differentiation circuit formed by the capacitance of the capacitor 30 and the resistance between the terminals 25a and 25c of the variable resistor 25.

When the sliding contacts 26d and 25d of the variable resistors 26 and 25 respectively between the terminals 26a and 26c and between the terminals *25a* and *25c*, a differentiated voltage, of the waveform *b*, of the saw-tooth voltage is supplied to the blue convergence coil 27 and to the red and green convergence coils 21 and 20. On the other hand, when the sliding contacts *26d* and *25d* of the variable resistors 26 and 25 are respectively between the terminals *26c* and *26b* and between the terminals *25c* and *25b*, the above mentioned differentiated voltage is not supplied to the convergence coils 27, 21 and 20.

The operational principles in the circuit of the instant third embodiment of the invention will now be described with reference to FIGS. 10A through 10E, FIGS. 11A, 11B and 11C, and FIG 12.

Figure 10A:
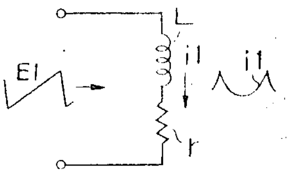
FIGS. 10A through 10E inclusive.
Figure 10B:
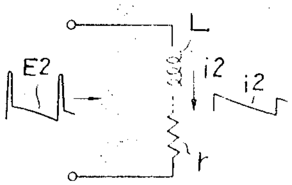
Figure 10C:
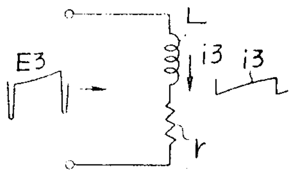
Figure 10D:
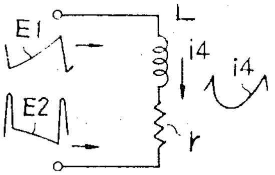
Figure 10E:
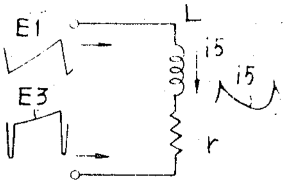

When, as indicated in FIG. 10A, a saw-tooth voltage of a waveform $E_1$ is supplied to a convergence coil (of an integration time constant $L/r$ of the order of from 3 to 5) having a winding resistance $r$ and an inductance L, a parabolic current indicated by a waveform $i_1$ flows therethrough. Furthermore, when a positive pulsive voltage of a waveform $E_2$ as indicated in FIG. 10B is supplied to the above mentioned convergence coil, a current as indicated by the waveform $i_2$ flows therethrough. When a negative pulsive voltage of a waveform $E_3$ as indicated in FIG. 10C is applied to the convergence coil, a current as indicated by the waveform $i_3$ flows therethrough. When a saw-tooth voltage of the waveform $E_1$ and a positive pulsive voltage of the waveform $E_2$ are supplied to the convergence coil as indicated in FIG. 10D, a parabolic current having a tilt as indicated by waveform $i_4$ flows therethrough. Further, when a saw-tooth voltage of the waveform $E_1$ and a negative pulsive voltage of the waveform $E_3$ as indicated in FIG. 10E are supplied to the convergence coil, a parabolic current having a slope as indicated by wave $i_5$ flows therethrough.

Figure 11A:
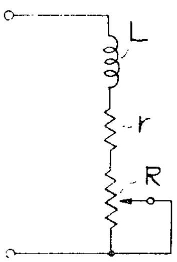
FIGS. 11A, 11B and 11C are schematic diagrams respectively indicating the principle of operation of the embodiment circuit illustrated in FIG. 9.

A case wherein, as indicated in FIG. 11A, a resistor R of high resistance value is connected in series with the above mentioned convergence coil will be considered. When a saw-tooth voltage of the waveform $E_1$ is supplied to the series circuit of the convergence coil and the resistor R in the state of $L/(r+R) << L/r$ (corresponding to the case of FIG. 11C), a current indicated by the waveform $i_R$ flows through the convergence coil. This waveform $i_R$ closely resembles the waveform $i_4$ of the current which flows through the convergence coil indicated in FIG. 10D in the case when a saw-tooth voltage of the waveform $E_1$ and a positive pulsive voltage of the waveform $E_2$ are similtaneously supplied to the convergence coil.

Accordingly, a variable resistor is used for the resistor R connected in series with respect to the convergence coil, and a saw-tooth voltage of the waveform $E_1$ is continually applied to the convergence coil. Then, by varying the position of the sliding contact of this variable resistor R, it is possible to obtain parabolic current of a waveform having any desired tilt between the waveform $i_1$ (same as the waveform $i_1$ shown in FIG. 10A) of the current which flows in the case where the resistance value of the variable resistor R is zero as indicated in FIG. 11B and the waveform $i_R$ of the current which flows in the case where the resistance value of the variable resistor R is maximum as indicated in FIG. 11C.

In the case where, for example, the sliding contact *26d* of the variable resistor 26 is positioned between the intermediate tap terminal *26c* and the terminal *26a*, the saw-tooth voltage supplied through the variable resistor 29 is applied to one terminal of the convergence coil 27, while the voltage resulting from the differentiation of the saw-tooth voltage is applied through the capacitor 30 and the sliding contact *26d* of the variable resistor 26 to the other terminal of the convergence coil 27. In this case, therefore, a current of a waveform similar to the waveform $i_5$ shown in FIG. 10E flows through the convergence coil 27.

Figure 11B:
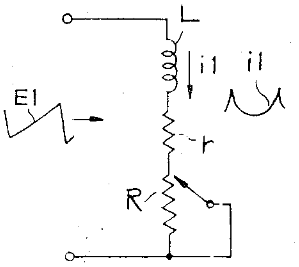
Figure 11C:
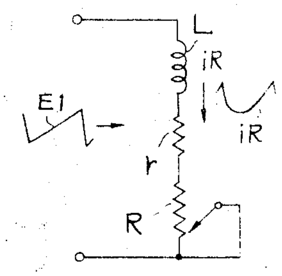

In the case where the sliding contact *26d* of the variable resistor 26 is positioned between the intermediate tape terminal *26c* and the unconnected terminal *26b*, a current of a waveform between the waveform $i_1$ as shown in FIG. 11B and the waveform $i_R$ as shown in FIG. 11C depending on the position of the sliding contact *26d* flows through the convergence coil 27.

Accordingly, by appropriately adjusting the position of the sliding contact *26d* of the variable resistor 26, a parabolic current of a waveform with a suitable tilt can be produced. This feature of the above described circuit is similarly attainable with respect also to the circuit of the variable resistor 25 and the convergence coils 20 and 21.

Next, a fourth embodiment of the circuit according to the invention in which the problems accompanying the circuit of the aforedescribed first embodiment have been solved will now be described with reference to FIG. 12, the parts which are the same as or similar to those of the circuit of FIG. 1 are designated by like reference numerals and characters, but description of thes parts will not be repeated.

Figure 12:
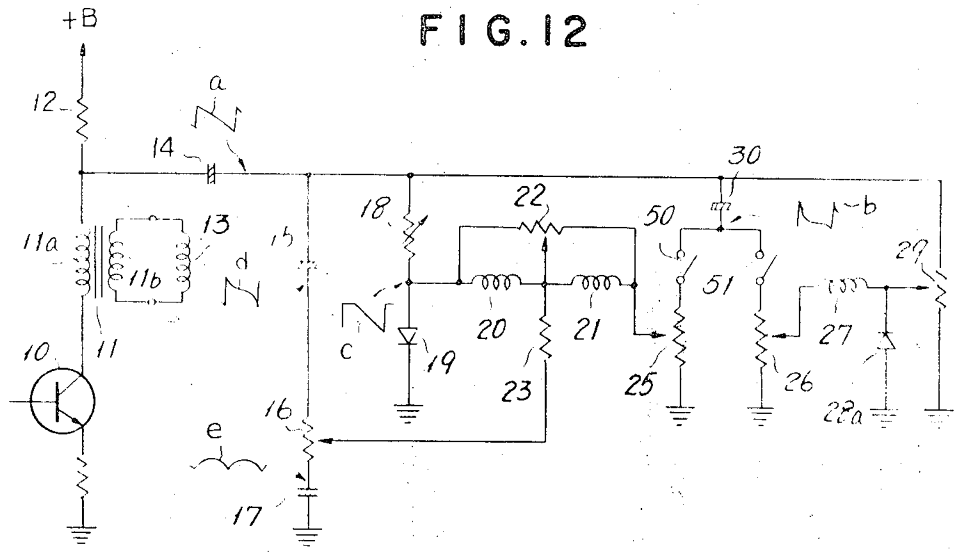
FIG. 12 is a circuit diagram showing a fourth embodiment of a vertical convergence circuit according to the invention.

The circuit of this fourth embodiment illustrated in FIG. 12 differs in organization from that of the first embodiment in that switches 50 and 51 are respectively connected between the capacitor 30 and the R-G and B tilt variable resistors 25 and 26. The remainder of the circuit construction is similar to that of the first embodiment. Thus, a voltage obtained by differentiating a saw-tooth voltage is supplied by way of the sliding contacts of the variable resistors 25 and 26 respectively to the convergence coils 21, 20 and 27 only when the switches 50 and 51 are closed.

In the case where the switch 51, for example, is open, the only result is that a saw-tooth voltage is supplied through the variable resistor 29 to one end of the convergence coil 27. The other end of this coil 27 is in a state wherein, through the sliding contact of the variable resistor 26, the resistance thereof is connected in series therewith. In this case, therefore, a current of a waveform of a tilt configuratipn similar to that of the current indicated by the waveform $i_R$ in FIG. 11C (closely resembling the waveform $i_4$ shown in FIG. 10D) flows through the convergence coil 27.

In the case where the switch 51 is in its closed state, the saw-tooth voltage supplied through the variable resistor 29 is supplied to one end of the convergence coil 27, while a voltage obtained by differentiation of the saw-tooth voltage is supplied to the other end of the coil 27 through the capacitor 30 and the switch 51. In this case, therefore, a current of a tilt waveform similar to the current of the waveform $i_5$ shown in FIG. 10E flows through the convergence coil 27.

Therefore, by opening and closing the switch 51, it is possible to vary the tilt configuration of the parabolic curent passed through the convergence coil 27. The above described operation feature is afforded also in the case of the supply of parabolic curent relative to the circuit of the switch 50 and the convergence coils 20 and 21.

Figure 13:
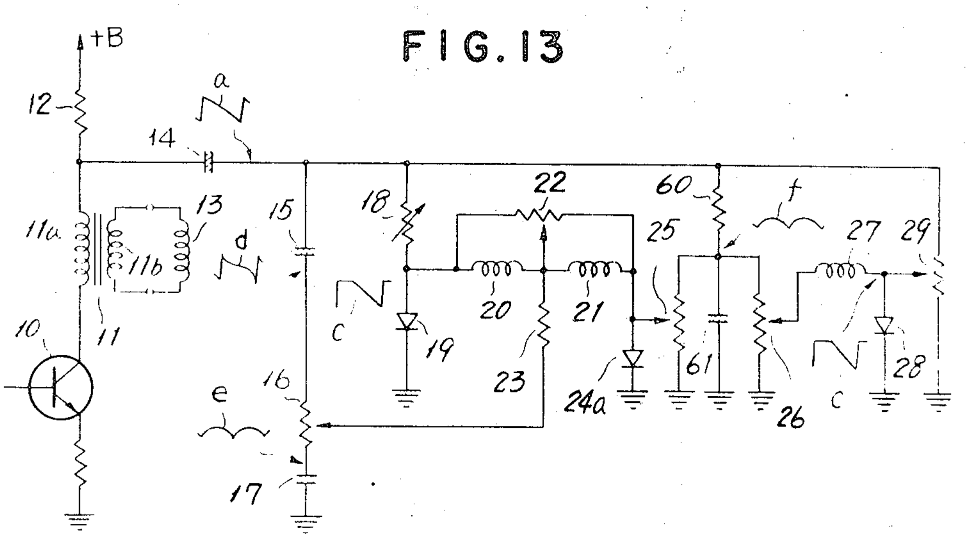
FIG. 13 is a circuit diagram showing a fifth embodiment of a vertical convergence circuit according to the invention.

Next, a fifth embodiment of the circuit of the invention in which the problems accompanying the first embodiment have been solved will be described below with reference to FIG. 13, in which parts which are the same as or similar to those in FIG. 1 are designated by like reference numerals and characters, repeated detailed description thereof being omitted.

This fifth embodiment differs in circuit construction from the first embodiment in that a resistor 60 is used in place of the capacitor 30 of the first embodiment, and a capacitor 61 is connected in parallel with the variable resistors 25 and 26. The resistor 60 and the capacitor 61 form an integration circuit. Accordingly, the saw-tooth voltage of the waveform *a* supplied through the capacitor 14 is rendered by this integration circuit into a voltage of a waveform similar to the parabolic waveform *f* indicated in FIGS. 6 and 7A, which is then supplied to one end of each of th convergence coils 21 and 27. In all other respects, the operation of the circuit of this embodiment is the same as that of the circuits of the embodiments indicated in FIGS. 1 and 6.

It is to be observed that a diode 24*a* is connected with a polarity opposite that of the diode 24 shown in FIG. 1. The diode 24*a* operates to clamp the parabolic voltage applied to the convergence coil circuit through the R-G tilt variable resistor 25 and causes the correction current to increase. In the case where the saw-tooth voltage of the waveform *a* is amply large, the diode 24*a* may be omitted.

In each of the above described embodiments of the invention, the connection positions of the red convergence coil 21 and the green convergence coil 20 can be interchanged to produce the same result.

Further, this invention is not limited to these embodiments but various variations and modifications may be made without departing from the scope and spirit of the invention.

What I claim is:

1. A vertical convergence circuit comprising:

a transformer having a vertical deflection coil connected across its secondary winding;

a resistor connected in series with the primary winding of said transformer;

a series combination of first and second convergence coils;

first means for supplying energy to one end of said series combination through a first variable resistor from the junction between said primary winding and said resistor;

second means for supplying said energy from the junction between said primary winding and said resistor to a differentiation circuit comprising a first capacitor and a second variable resistor having a sliding contact which is connected to the other end of said series combination;

third means for supplying said energy from the junction between said primary winding and said resistor to a series circuit of a second capacitor, a third variable resistor and a third capacitor, said third variable resistor having a sliding contact connected to the junction between the first and second convergence coils, the capacitance of said second capacitor being relatively small and the capacitance of said third capacitor being relatively large so that said series circuit forms a differentiation circuit when said sliding contact is positioned near one terminal of said third variable resistor which is connected to said second capacitor, and said series circuit forms an integration circuit when said sliding contact is positioned near the other terminal of said third variable resistor which is connected to said third capacitor.

2. The vertical convergence circuit as defined in claim 1 further comprising a fourth variable resistor connected across both ends of said series combination of said first and second convergence coils, said fourth variable resistor having a sliding contact which is connected to the junction between the first and second coils.

3. The vertical convergence circuit as defined in claim 1 wherein said second variable resistor further has a fixed intermediate tap connected to ground, one terminal of said second variable resistor being connected to said first capacitor and the other terminal of said second variable resistor having no connection.

4. The vertical convergence circuit as defined in claim 3 further comprising a fourth variable resistor connected across both ends of said series combination of said first and second convergence coils, said fourth variable resistor having a sliding contact which is connected to the junction between the first and second convergence coils.

5. The vertical convergence circuit as defined in claim 4 further comprising a third convergence coil, means for supplying said energy to one end of said third convergence coil through a fifth variable resistor from the junction between said primary winding and said resistor, and a sixth variable resistor having a fixed intermediate tap connected to ground and having a sliding contact connected to the other end of said third convergence coil, one terminal of said sixth variable resistor being connected to said one terminal of said second variable resistor, the other terminal of said sixth variable resistor having no connection.

6. The vertical convergence circuit as defined in claim 1 wherein said differentiation circuit comprising a first capacitor and a second variable resistor comprises a series circuit of said first capacitor, a switch and said second variable resistor.

7. The vertical convergence circuit as defined in claim 6 further comprising a fourth variable resistor connected across the both ends of said series combination of said first and second convergence coils, said fourth variable resistor having a sliding contact which is connected to the junction between the first and second convergence coils.

8. The vertical convergence circuit as defined in claim 7 further comprising a third convergence coil, means for supplying said energy to one end of said third convergence coil through a fifth variable resistor from the junction between said primary winding and said resistor, and a series circuit of another switch and sixth variable resistor, said series circuit being connected in parallel with the series combination of said switch and said second variable resistor, said sixth variable resistor having a sliding contact connected to the other end of said third convergence coil.

9. A vertical convergence circuit comprising:

a transformer having a vertical deflection coil connected across its secondary winding;

a resistor connected in series with the primary winding of said transformer;

a series combination of first and second convergence coils;

first means for supplying energy to one end of said series combination through a first variable resistor from the junction between said primary winding and said resistor;

second means for supplying said energy from the junction between said primary winding and said resistor to a first series circuit of a first capacitor, a second variable resistor and a second capacitor, said second variable resistor having a sliding contact connected to the other end of said series combination, the capacitance of said first capacitor being relatively small and the capacitance of said second capacitor being relatively large so that said first series circuit forms a differentiation circuit when said sliding contact is positioned near one terminal of said second variable resistor which is connected to said first capacitor, and said first series circuit forms an integration circuit when said sliding contact is positioned near the other terminal of said second variable resistor which is connected to said second capacitor;

third means for supplying said energy from said junction between said primary winding and said resistor to a second series circuit of a third capacitor, a third variable resistor and a fourth capacitor, said third variable resistor having a sliding contact connected to the junction between the first and second convergence coils, the capacitance of said third capacitor being relatively small and the capacitance of said fourth capacitor being relatively large so that said second series circuit forms a differentiation circuit when said sliding contact of said third variable resistor is positioned near one terminal of said third variable resistor which is connected to said third capacitor, and said second series circuit forms an integration circuit when said sliding contact of said third variable resistor is positioned near the other terminal of said third variable resistor which is connected to said fourth capacitor.

10. The vertical convergence circuit as defined in claim 9 further comprising a fourth variable resistor connected across both ends of said series combination of said first and second convergence coils, said fourth variable resistor having a sliding contact which is connected to the junction between the first and second convergence coils.

11. The vertical convergence circuit as defined in claim 9 further comprising a diode connected across said fourth capacitor.

12. The vertical convergence circuit as defined in claim 10 further comprising a third convergence coil, means for supplying said energy to one end of said third convergence coil through a fifth variable resistor from the junction between said primary winding and said resistor, and means for supplying said energy from the junction between said primary winding and said resistor to a third series circuit of a fifth capacitor, a sixth variable resistor and a sixth capacitor, said sixth variable resistor having a sliding contact connected to the other end of said third convergence coil, the capacitance of said fifth capacitor being relatively small and the capacitance of said sixth capacitor being relatively large so that said third series circuit forms a differentiation circuit when said sliding contact of said sixth variable resistor is positioned near one terminal of said sixth variable resistor which is connected to said fifth capacitor, and said third series circuit forms an integration circuit when said sliding contact of said sixth variable resistor is positioned near the other terminal of said sixth variable resistor which is connected to said sixth capacitor.

13. The vertical convergence circuit as defined in claim 12 further comprising a resistor connected across said sixth capacitor.

* * * * *